(12) United States Patent
Rothan et al.

(10) Patent No.: US 6,997,584 B1
(45) Date of Patent: Feb. 14, 2006

(54) BICYCLE LAMP

(76) Inventors: Russell Rothan, P.O. Box 22390, Lake Buean Vista, FL (US) 32830; Jason Barber, P.O. Box 22623, Lake Buena Vista, FL (US) 32830; Daniel Deutsch, P.O. Box 22623, Lake Buena Vista, FL (US) 32830

( * ) Notice: Subject to any disclaimer, the term of this patent is extended or adjusted under 35 U.S.C. 154(b) by 0 days.

(21) Appl. No.: 10/733,875

(22) Filed: Dec. 11, 2003

Related U.S. Application Data

(60) Provisional application No. 60/432,714, filed on Dec. 12, 2002.

(51) Int. Cl.
*B62J 6/00* (2006.01)
*F21V 33/00* (2006.01)

(52) U.S. Cl. ............... 362/473; 362/474; 362/240; 362/245; 362/246; 362/278; 362/320; 362/396; 280/200; 340/432

(58) Field of Classification Search ........ 362/234–235, 362/240, 244–246, 278, 320, 352, 249, 252, 362/396, 473–475; 315/77; 280/200; 340/432
See application file for complete search history.

(56) References Cited

U.S. PATENT DOCUMENTS

| | | | |
|---|---|---|---|
| 2,151,485 A * | 3/1939 | Pawsat | 362/473 |
| 3,834,423 A * | 9/1974 | Elson | 138/122 |
| 3,889,717 A * | 6/1975 | Obadal et al. | 138/131 |
| 3,890,033 A * | 6/1975 | McGee | 359/227 |
| 4,005,874 A * | 2/1977 | Ohtani | 280/288.4 |
| 4,047,150 A * | 9/1977 | Kelley | 340/473 |
| 4,088,882 A * | 5/1978 | Lewis | 362/217 |
| 4,204,191 A * | 5/1980 | Daniels | 340/432 |
| 4,215,390 A * | 7/1980 | Brandt | 362/311 |
| 4,325,108 A * | 4/1982 | Spingler | 362/183 |
| 4,422,719 A * | 12/1983 | Orcutt | 385/123 |
| 4,715,681 A * | 12/1987 | Johnson | 359/526 |
| 4,814,951 A * | 3/1989 | Larsen | 362/473 |
| 4,819,135 A * | 4/1989 | Padilla et al. | 362/473 |
| 5,197,795 A * | 3/1993 | Mudrovich | 362/473 |
| 5,276,593 A * | 1/1994 | Lighthill et al. | 362/473 |
| 5,526,240 A * | 6/1996 | Kuo | 362/473 |
| 5,618,052 A * | 4/1997 | Rendall | 280/288.4 |
| 5,823,653 A * | 10/1998 | Elam et al. | 362/473 |
| 5,871,269 A * | 2/1999 | Chien | 362/474 |
| 6,017,335 A * | 1/2000 | Burnham | 604/527 |
| 6,031,958 A * | 2/2000 | McGaffigan | 385/146 |
| 6,139,174 A * | 10/2000 | Butterworth | 362/555 |
| 6,158,881 A * | 12/2000 | Carne | 362/473 |

(Continued)

*Primary Examiner*—Stephen Husar
*Assistant Examiner*—Jason Han
(74) *Attorney, Agent, or Firm*—Allen, Dyer, Doppelt, Milbrath & Gilchrist, P.A.

(57) ABSTRACT

An apparatus and method for a bicycle lamp includes a plurality of light sources; a source of power; an electrical circuit connecting the source of power with the plurality of light sources; at least one switch connected in the electrical circuit; a diffuser positioned adjacent at least one individual light source of the plurality of light sources, the diffuser including translucent resilient material supported on a helical coil defining a central passageway extending through the diffuser, the diffuser passageway being of sufficient dimension to accept a bicycle tube therethrough; a housing coupled to the diffuser, the housing having a housing passageway extending therethrough, wherein the housing passageway is generally complementary to and aligned with the diffuser passageway so as to provide a continuous opening through the bicycle lamp; and a reflector adjustably connected to the housing spaced apart from the housing passageway.

12 Claims, 4 Drawing Sheets

U.S. PATENT DOCUMENTS

| | | | |
|---|---|---|---|
| 6,249,372 B1 * | 6/2001 | Kobayashi et al. | 359/326 |
| 6,417,019 B1 * | 7/2002 | Mueller et al. | 438/29 |
| 6,459,919 B1 * | 10/2002 | Lys et al. | 600/407 |
| 6,517,213 B1 * | 2/2003 | Fujita et al. | 362/84 |
| 6,533,438 B1 * | 3/2003 | Ter-Hovhannisian | 362/276 |
| 6,779,913 B1 * | 8/2004 | Niezrecki et al. | 362/473 |
| 2003/0133311 A1 * | 7/2003 | Robertson et al. | 362/555 |
| 2003/0155856 A1 * | 8/2003 | Shiiki et al. | 313/483 |
| 2004/0095776 A1 * | 5/2004 | Pisula | 362/473 |

* cited by examiner

BICYCLE LAMP

RELATED APPLICATION

This application claims priority from co-pending provisional application Ser. No. 60/432,714, which was filed on Dec. 12, 2002, and which is incorporated herein by reference in its entirety.

FIELD OF THE INVENTION

This invention relates to the field of lighting, lamps and reflectors, and more specifically to a lamp for a bicycle, and particularly adapted for mounting on a bicycle's structural tube, most preferably the seat post of a bicycle.

BACKGROUND OF THE INVENTION

Lamps and reflectors therefor have found innumerable uses since the original invention of the light bulb. Typical of such uses are various electric lamps and reflectors adapted for fitting to a bicycle to thereby improve the vehicle's visibility in low light situations, such as at night.

SUMMARY OF THE INVENTION

With the foregoing in mind, the present invention advantageously provides a bicycle lamp comprising at least one light source and preferably a plurality of light sources. A source of power is connected in an electrical circuit with the plurality of light sources. At least one switch is connected in the electrical circuit. The switch may include a photo sensor, for example, to prevent the lamp from being energized during daylight. A diffuser is positioned adjacent at least one individual light source of the plurality of light sources, the diffuser most preferably comprising translucent resilient material supported on a helical coil defining a central passageway extending through the diffuser. In one embodiment of the invention, the diffuser most preferably comprises a fluorescent material responsive to UV light. The diffuser passageway is of sufficient dimension to accept a bicycle tube therethrough. A housing is coupled to the diffuser, the housing having a housing passageway extending therethrough and which is generally complementary to and aligned with the diffuser passageway so as to provide a continuous opening through the bicycle lamp. The lamp also includes a reflector adjustably connected to the housing and spaced apart from the housing passageway. The reflector may comprise fluorescent material responsive to UV light and at least one light source of the plurality of light sources which emits UV light.

In one preferred embodiment of the bicycle lamp, the light sources comprise light-emitting diodes (LEDs), and at least one light source of the plurality of light sources is positioned in the reflector. Most preferably, at least one individual light source of the plurality of light sources emits ultraviolet (UV) light. In the invention, typically the source of power comprises at least one battery. Also, the at least one switch comprises a manual on-off switch, but may also include a light sensor, particularly in combination with one or more additional switches.

In yet another embodiment of the invention the lamp includes a second housing having a second housing passageway extending therethrough. The second housing is coupled to the second end of the diffuser so as to have the second housing passageway approximately aligned with the diffuser passageway and wherein the second housing passageway is dimensioned for accepting a bicycle tube therethrough. Either the first housing, the second housing or both may include at least one fastener engageable with a bicycle tube positioned through the lamp to secure the lamp thereon. The lamp housing may contain the source of power, the at least one switch, and at least one light source of the plurality of light sources.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which.

DETAILED DESCRIPTION OF THE PREFERRED EMBODIMENT

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, and other references mentioned herein are incorporated by reference in their entirety. In case of conflict, the present specification, including any definitions, will control. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

FIGS. 1 through 8 illustrate the bicycle lamp 10 of the present invention. It should be understood at the outset that when used herein the term bicycle tube refers to any tube forming part of the structure of a bicycle, for example, part of the bicycle frame, part of the handlebars, or part of an attachment connected to the bicycle. The term tube is not intended to refer to any portion of the bicycle wheel, tire, or inner tube if so equipped. Also, the term ultraviolet (UV) light is intended to include any light or combination of light wavelengths which sufficiently excites a fluorescent compound to emit light by fluorescence, and particularly ultraviolet light, near-ultraviolet, and even blue light to an extent.

Figure 1:
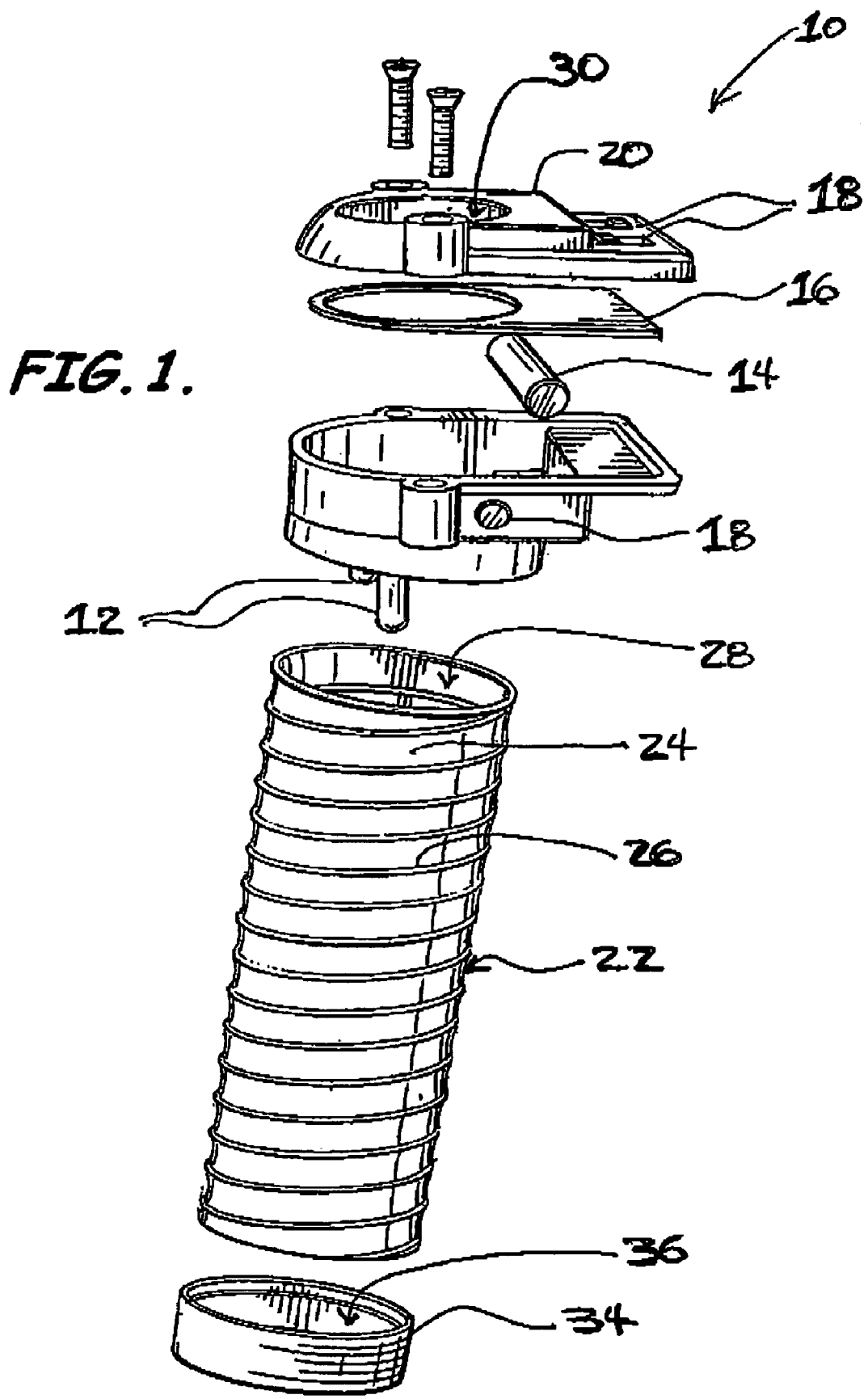
FIG. 1 is an exploded view of the seat-post light according to an embodiment of the present invention.
Figure 3:
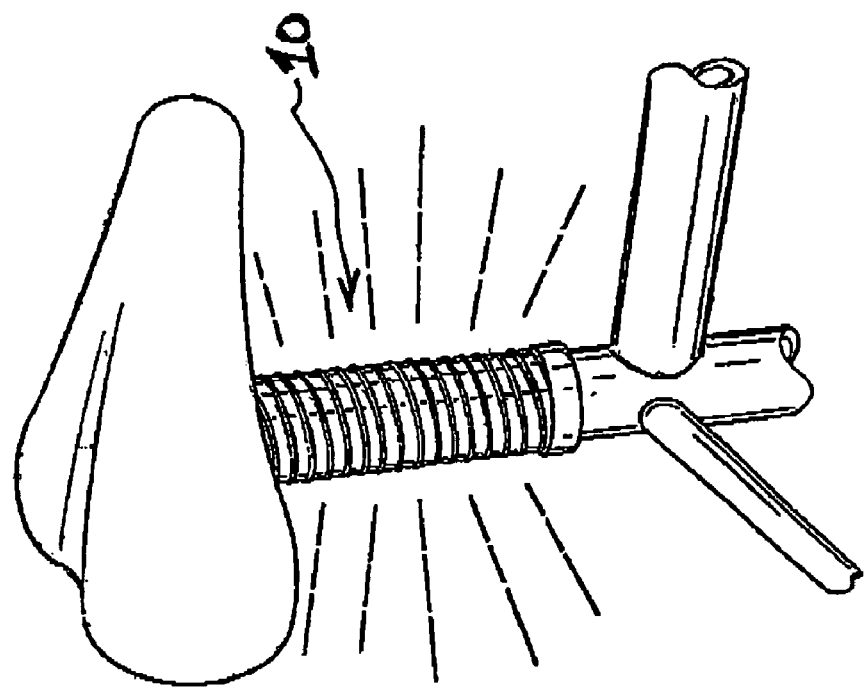
FIG. 3 illustrates a seat-post light according to the present invention positioned on a bicycle for use.
Figure 2:
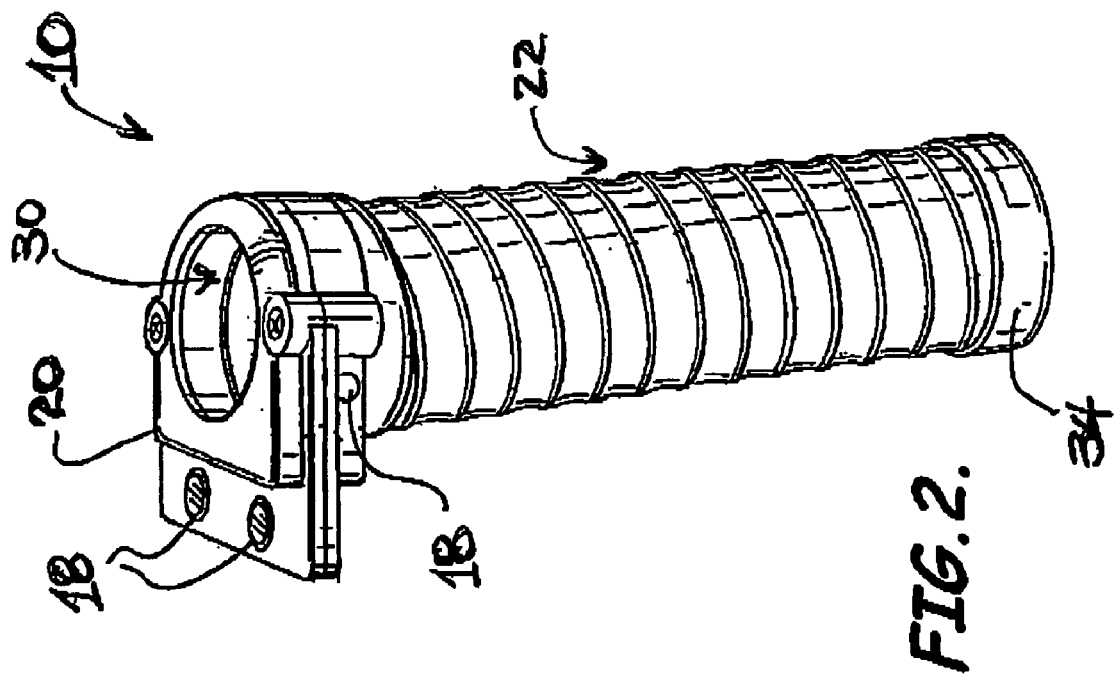
FIG. 2 is a perspective view of the seat-post light of FIG. 1.
Figure 4:
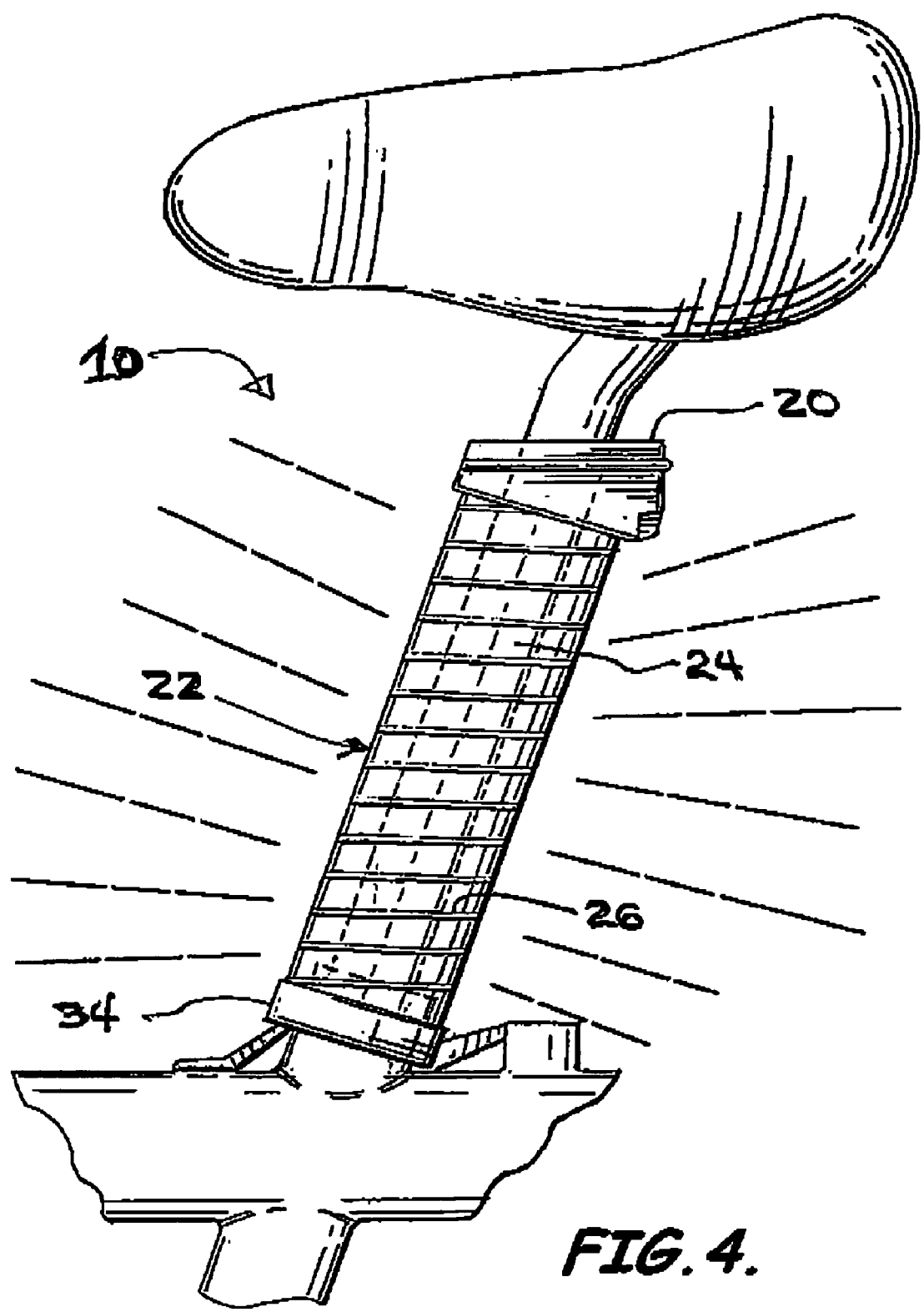
FIG. 4 shows a side elevation view of the seat-post light of FIG. 1 positioned on a bicycle seat-post.
Figure 6:
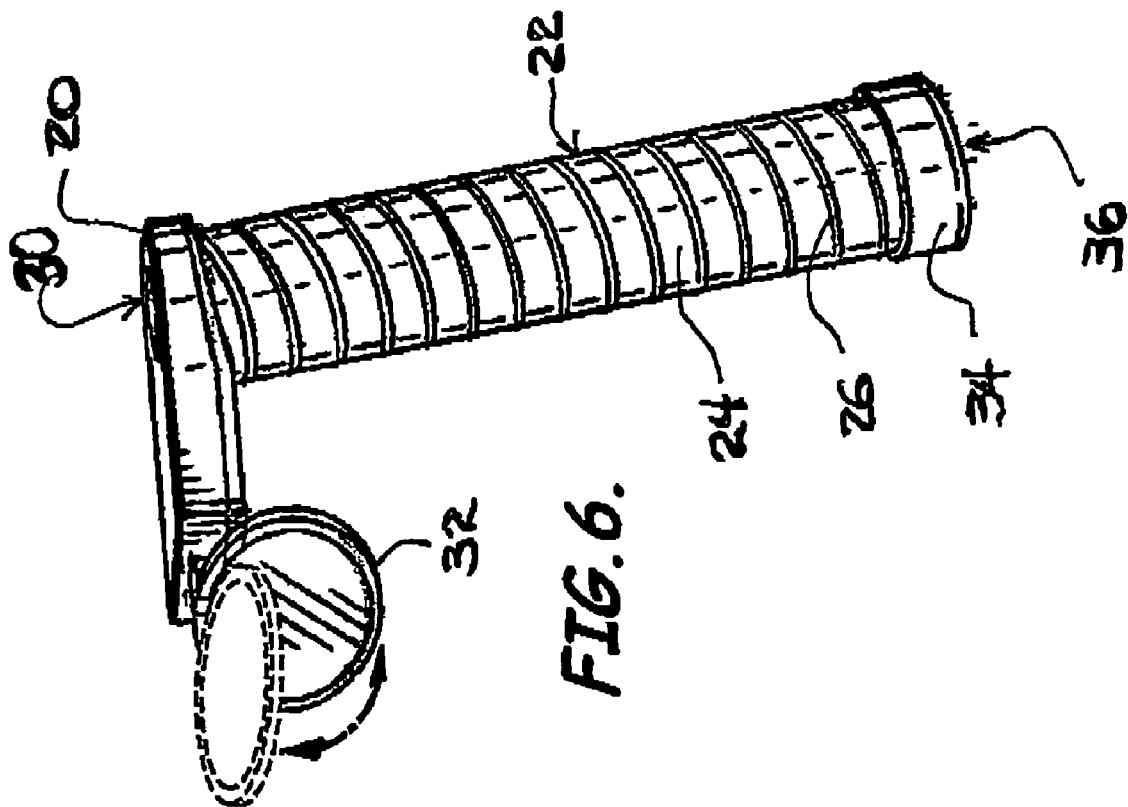
FIG. 6 shows a closer detail of the seat-post light of FIG. 5 showing the adjustability of the reflector.
Figure 5:
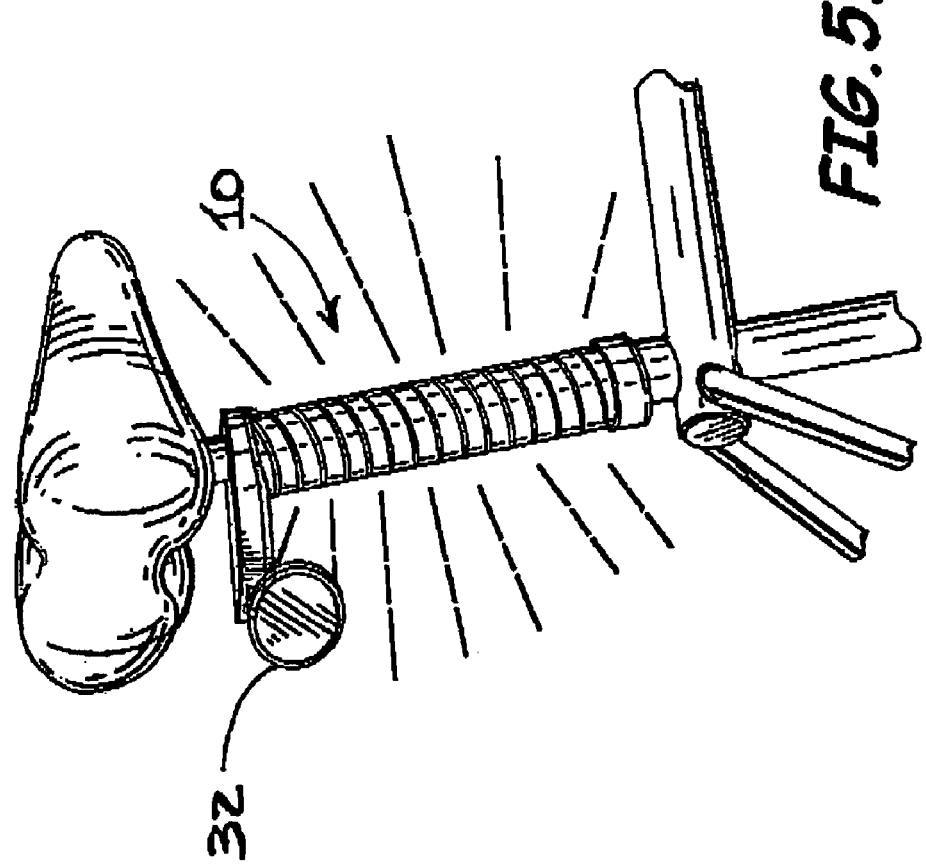
FIG. 5 depicts the seat-post light of FIG. 1 in place on a bicycle and having a reflector positioned on the light.

The bicycle lamp 10 of the present invention includes at least one light source 12 and, preferably, a plurality of light sources. As shown in exploded view in FIG. 1, light sources 12, a source of power 14, an electrical circuit 16 connecting the source of power with the plurality of light sources, and at least one switch 18 connected in the electrical circuit are associated with a housing 20. A diffuser 22 is positioned adjacent at least one individual light source 12 of the plurality of light sources and preferably with the light source inside the diffuser. As shown, the diffuser 22 preferably comprises a translucent material 24 supported on a helical coil 26 which defines a central passageway extending through the diffuser, the diffuser passageway 28 being of sufficient dimension to accept a bicycle tube therethrough for mounting the lamp on the bicycle. The translucent material 24 is also preferably relatively flexible, having the property of stretching and contracting as provided by the helical coil 26 backbone of the diffuser, as best shown in FIG. 1. The housing 20 is coupled to the diffuser 22, the housing also having a housing passageway 30 extending therethrough, the housing passageway being generally complementary to and aligned with the diffuser passageway 28 so as to provide a continuous opening through the bicycle lamp 10. Additionally, a reflector 32 may be adjustably connected to the housing 20 spaced apart from the housing passageway 30. The reflector 32 may be a passive reflector, or may be lit by including a light source 12 associated with the reflector. In another embodiment, the bicycle lamp 10 includes a reflector 32 having fluorescent material responsive to UV light and at least one light source 12 of the plurality of light sources which emits UV light.

In other embodiments of the invention, the bicycle lamp 10 includes light sources 12 which preferably comprise light-emitting diodes (LEDs). Most preferably, at least one individual light source 12 of the plurality of light sources, particularly one or more LEDs, emits ultraviolet (UV) light. Also, the skilled will readily understand that the typical power source for use in the invention is one or more batteries. In the present bicycle lamp 10 the at least one switch 18 may be a manual on-off switch, may be a light sensor, or may be a combination of switches. In a bicycle lamp 10 having a light source 12 emitting UV light, the diffuser 22 preferably includes a fluorescent material responsive to UV light.

In a further embodiment, the bicycle lamp 10 includes a second housing 34 having a second housing passageway 36 extending therethrough, the second housing coupled to the second end of the diffuser 22 so as to have the second housing passageway approximately aligned with the diffuser passageway 28 and wherein the second housing passageway is dimensioned for accepting a bicycle tube therethrough. This arrangement is best shown in FIGS. 1, 4, 5 and 6. The housing 20 additionally may include at least one fastener engageable with a bicycle tube positioned through the lamp to secure the lamp thereon. Most preferably, the housing 20 also contains the source of power 14, the at least one switch 18, and at least one light source 12 of the plurality of light sources.

The skilled should understand that the invention is herein described primarily as a lamp having a passageway for therethrough receiving a bicycle tube, the lamp may be structured in various ways for mounting on a bicycle in this manner. In one approach, the present lamp may be slipped over a bicycle tube which has a free end available, for example, a bicycle seat post when the seat has been temporarily removed. In another embodiment, the lamp of the invention may be structured having two longitudinal halves, as illustrated by the broken line shown in FIG. 4, so that the lamp may be split into halves which are placed over the bicycle tube, and then rejoined to form the complete lamp. This alternate approach allows use of the lamp with any bicycle tube, whether or not the tube has a free end available. Accordingly, the invention is intended to include these structural variations within its scope.

Method aspects of the present invention include a method of lighting a bicycle. The method comprises mounting a lamp on a bicycle by receiving a bicycle tube in a passageway within the lamp. The method continues by generating light from at least one light source 12 connected to a power source through an electrical circuit 16 in the lamp, the at least one light source positioned adjacent the bicycle tube, and by diffusing the generated light through a diffuser 22 coupled to the light source, the diffuser defining the passageway. Thereafter the method stops.

Additional method aspects include wherein the passageway through the diffuser 22 is a generally cylindrical passageway. And in the method the passageway is most preferably generally centrally positioned within the bicycle lamp 10. As noted above, in the method the generated light may include UV light and in one embodiment of the method the light may consist of UV light. Preferably, the method also includes exciting a fluorescent material to produce fluorescent light.

Accordingly, in the drawings and specification there have been disclosed typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed:

1. A bicycle seat-post lamp comprising:
   a plurality of light sources;
   a source of power;
   an electrical circuit connecting said source of power with said plurality of light sources;
   at least one switch connected in said electrical circuit;
   a diffuser positioned adjacent at least one individual light source of the plurality of light sources, said diffuser consisting of an unbroken tubular member comprising light permeable resilient material supported on a helical coil defining a central passageway extending through said diffuser, the diffuser passageway being of sufficient dimension to accept a bicycle seat-post therethrough;
   a housing having an open first end and a spaced apart second end coupled to said diffuser, said housing having a housing passageway extending from the first end to the second end and aligned with the diffuser passageway, said housing containing said power source and having said plurality of light sources positioned adjacent the second end.

2. The bicycle lamp of claim 1, wherein said plurality of light sources comprises light-emitting diodes (LEDs).

3. The bicycle lamp of claim 1, wherein at least one light source of said plurality of light sources is positioned in said reflector.

4. The bicycle lamp of claim 1, wherein at least one individual light source of said plurality of light sources emits ultraviolet (UV) light.

5. The bicycle lamp of claim 1, wherein said source of power comprises at least one battery.

6. The bicycle lamp of claim 1, wherein said at least one switch comprises a manual on-off switch.

7. The bicycle lamp of claim 1, wherein said at least one switch comprises a light sensor.

8. The bicycle lamp of claim 1, wherein said diffuser comprises a fluorescent material responsive to UV light.

9. The bicycle lamp of claim 1, further comprising a second housing having a second housing passageway extending therethrough, said second housing coupled to the second end of said diffuser so as to have said second housing passageway approximately aligned with said diffuser passageway and wherein said second housing passageway is dimensioned for accepting a bicycle tube therethrough.

10. The bicycle lamp of claim 1, wherein said housing further comprises at least one fastener engageable with a bicycle tube positioned through the lamp to secure the lamp thereon.

11. The bicycle lamp of claim 1, wherein said housing contains said source of power, said at least one switch, and at least one light source of said plurality of light sources.

12. The bicycle lamp of claim 1, wherein said reflector comprises fluorescent material responsive to UV light and at least one light source of the plurality of light sources which emits UV light.

* * * * *